(No Model.)
G. N. WILSON.
HOSE COUPLING.
No. 592,899. Patented Nov. 2, 1897.
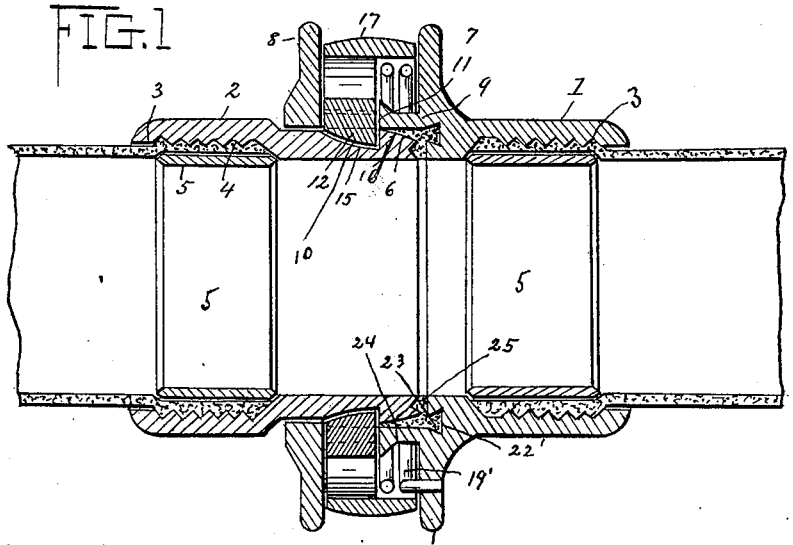
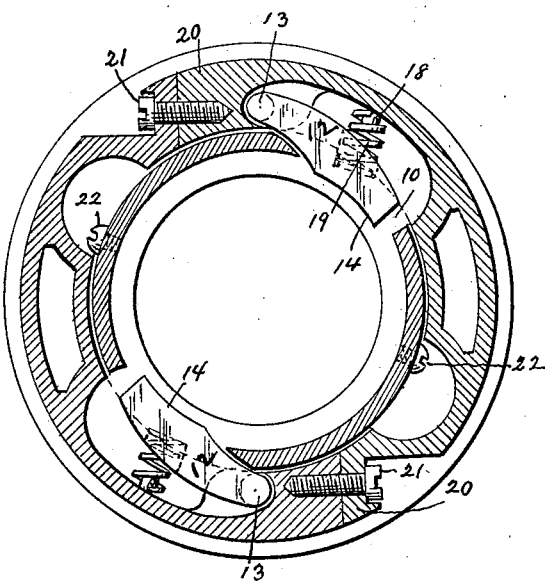 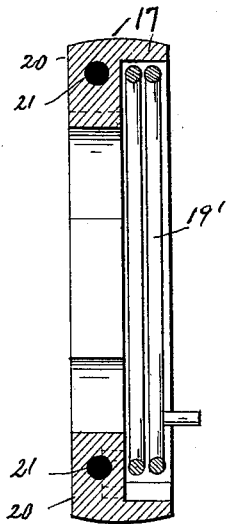
WITNESSES
INVENTOR
Gottfried N. Wilson.
By John Hedderburn
Attorney

UNITED STATES PATENT OFFICE.

GOTTFRIED N. WILSON, OF NEW YORK, N. Y.

HOSE-COUPLING.

SPECIFICATION forming part of Letters Patent No. 592,899, dated November 2, 1897.

Application filed January 27, 1897. Serial No. 620,952. (No model.)

*To all whom it may concern:*

Be it known that I, GOTTFRIED N. WILSON, of New York, in the county of New York and State of New York, have invented certain new and useful Improvements in Hose-Couplings; and I do hereby declare the following to be a full, clear, and exact description of the invention, such as will enable others skilled in the art to which it appertains to make and use the same.

This invention relates to hose-couplings, being designed to facilitate the coupling together of adjacent sections of hose and to enable said sections to be readily detached from each other whenever necessary.

The invention consists in certain novel features and details of construction and arrangement of parts, as hereinafter fully described, illustrated in the drawings, and embodied in the claims.

In the accompanying drawings, Figure 1 is a longitudinal section through the members of the coupling, showing the same in engagement with each other. Fig. 2 is a sectional view taken in line with the abutting faces of the sections, showing the arrangement of clutches, &c. Fig. 3 is a sectional view of the spring-actuated ring.

Similar numerals of reference designate corresponding parts in all the figures of the drawings.

Referring to the drawings, the improved hose-coupling comprises, essentially, two sections 1 and 2, each of which is provided at its outer portion with an annular cavity 3, having a series of ratchet-shaped teeth 4 to receive the inner end of the flexible hose, the same being retained in place by means of a ring 5 or in any other convenient manner.

The section 2 of the coupling is made of a size which will adapt it to fit into the inner end of the section 1, and the inner end of said section 2 is beveled, as indicated at 6, to facilitate its insertion into the other section, and also to raise the pivoted clutches hereinafter described. The other section 1 is provided at its inner end with spaced circumferential flanges 7 and 8, connected by means of an interposed integrally-formed web 9, and this web is provided with apertures 10, through which the clutches operate, and also with a circumferential rib 11 for giving increased bearing-surface to said clutches. Two clutches (indicated at 12) are employed, the same being arranged at diametrically opposite points and each being pivoted to and carried by a ring 17 by means of a screw 13. Each clutch is provided at its free end with a catch-lip 14, which is beveled or chamfered, as indicated at 15, to enable the same to be raised by the beveled end 6 of the section 2 of the coupling, and said section, as well as each of the clutches, is provided with square abutting circumferential faces 16 for preventing the separation of the coupling-sections when the hose is subjected to linear strain.

The clutches are operated by means of a ring or annulus 17, which works between the flanges 7 and 8 and is made partially rotatable. This ring is provided with inwardly-projecting studs 18, forming seats for coiled springs 19, which set in recesses in the outer surfaces of the clutches 12 and force the latter inward when the ring 17 is turned in one direction. When the ring is turned in the opposite direction, the catch-lips 14 will be moved outward out of engagement with the notches 15 in the section 2 of the coupling.

19' designates a spring which is also arranged between the flanges 7 and 8, one terminal of the spring being inserted through an opening in the flange 7 and the other terminal inserted in a socket in an inwardly-extending portion of the ring 17, the tension of said spring being exerted to maintain the clutches in operative engagement with the section 2 of the coupling. By rotating said ring against the tension of the spring the clutches may be thrown out of engagement for uncoupling the sections 1 and 2. The ring 17 is diametrically divided or made in two equal sections, the latter being provided at their meeting faces with thickened portions 20, the same being bored and threaded to receive screws 21, by means of which the sections of the ring may be firmly united after the same are placed between the flanges 7 and 8.

22 designates a pair of stops in the form of projections or screws on the web 9 of the section 1, said stops being adapted to coact with the inwardly-extending thickened portions 20 for limiting the rotation of the ring 17.

22' represents a rubber gasket fitted in a dovetail annular groove 23 in the section 1 and which is beveled at 24 to fit over the surface 16 of the other section 2 and also provided with a projection 25 to enter a V-shaped groove in the edge of section 2.

To couple adjacent sections of hose together, one coupling-section is simply inserted into the other section and turned slightly, so as to allow the clutches to snap into their respective notches. To uncouple the hose, the ring 17 is turned against the tension of the spring 19, thereby rocking the clutches out of engagement with the section 2 of the coupling and allowing the latter to be withdrawn from the remaining section.

The coupling above described is very simple and effective in operation and will greatly expedite the coupling and uncoupling of the sections of a line of hose.

Having thus described the invention, what is claimed as new is—

1. In a hose-coupling, two coupling-sections adapted to telescope one within the other, one of said sections being provided with one or more pivoted clutches and the other section with notches to receive said clutches, and a spring surrounding one of said sections and connected with said clutches so as to maintain the same in engagement with the opposing section, substantially as described.

2. In a hose-coupling, two coupling-sections arranged to telescope one within the other, spaced circumferential flanges on one section, pivoted clutches mounted between said flanges and adapted to engage notches in the opposing section, an operating-ring arranged outside of said clutches and between said flanges, and a spring surrounding the inner end of the outer section and engaging said ring for causing the same to act upon the clutches and force the same into engagement with the inner section, substantially as described.

3. In a hose-coupling, coupling-sections arranged to slide one within the other, the other section comprising spaced circumferential flanges, pivoted clutches arranged between said flanges, an annular web connecting said flanges and provided with apertures through which the clutches work so as to engage notches in the inner section of the coupling, an operating-ring extending around the coupling-sections and arranged between said flanges and also provided with inward projections which engage said clutches, and a spring surrounding one of the coupling-sections and engaging said ring for giving the same a normal tendency, substantially as and for the purpose described.

4. In a hose-coupling, two coupling-sections arranged to slide one within the other, spaced circumferential flanges on the outer section, a clip connecting said flanges and provided with openings, pivoted clutches arranged between said flanges and working through said openings and engaging notches in the inner section, a diametrically-divided operating-ring arranged between said flanges and outside of the clutches and engaging the latter, said ring being provided at its meeting points with thickened portions bored and threaded to receive connecting-screws, stops on said web coöperating with said thickened portions of the ring for limiting the movement of the latter, and a spring surrounding one of the coupling-sections and connected to said ring for giving the same a normal tendency, substantially as described.

In testimony whereof I have signed this specification in the presence of two subscribing witnesses.

GOTTFRIED N. WILSON.

Witnesses:
GEORGE F. BULLIS,
J. EDW. SWANSTROM.